United States Patent
Liedel et al.

(10) Patent No.: US 9,182,008 B2
(45) Date of Patent: Nov. 10, 2015

(54) ADJUSTMENT DEVICE FOR A ROTATING BODY AND ROTATING BODY

(75) Inventors: Markus Liedel, Pegnitz (DE); Thomas Helming, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 955 days.

(21) Appl. No.: 13/320,518

(22) PCT Filed: Apr. 28, 2010

(86) PCT No.: PCT/EP2010/055677
§ 371 (c)(1),
(2), (4) Date: Feb. 6, 2012

(87) PCT Pub. No.: WO2010/130578
PCT Pub. Date: Nov. 8, 2010

(65) Prior Publication Data
US 2012/0128492 A1    May 24, 2012

(30) Foreign Application Priority Data

May 13, 2009 (DE) .......................... 10 2009 003 056

(51) Int. Cl.
*F04D 29/66*    (2006.01)
*F16F 15/32*    (2006.01)
*G01M 1/36*    (2006.01)

(52) U.S. Cl.
CPC .............. *F16F 15/32* (2013.01); *F04D 29/662* (2013.01); *G01M 1/36* (2013.01)

(58) Field of Classification Search
CPC ............................... F04D 29/662; G01M 1/36
USPC ............................ 416/144, 145, 500; 415/119
See application file for complete search history.

(56) References Cited

U.S. PATENT DOCUMENTS

| | | | |
|---|---|---|---|
| 82,278 A * | 9/1868 | Benn | 241/292 |
| 5,929,544 A * | 7/1999 | Maekawa et al. | 310/88 |
| 6,908,284 B2 * | 6/2005 | Adrian | 416/134 R |
| 7,063,507 B2 * | 6/2006 | Hsieh | 416/144 |
| 8,814,519 B2 * | 8/2014 | Linnenbrock | 416/148 |

FOREIGN PATENT DOCUMENTS

| | | |
|---|---|---|
| JP | 57-165698 | 10/1982 |
| JP | 3-19401 | 1/1991 |
| JP | 4-71799 | 3/1992 |
| JP | 5-141392 | 6/1993 |
| JP | 6317293 | 11/1994 |

(Continued)

OTHER PUBLICATIONS

PCT/EP2010/055677 International Search Report dated Aug. 5, 2010 (2 pages).

*Primary Examiner* — Ninh H Nguyen
(74) *Attorney, Agent, or Firm* — Michael Best & Friedrich LLP (57) ABSTRACT

The invention relates to an adjustment device (30) for a rotating body (10; 21; 22), in particular a fan (10) of a cooling fan for a combustion engine, or a shaft (21) or a rotor (22) of an electric motor (20), comprising a rotation axis (R), wherein a mass (311; 10; 11; 14) that rotates around the rotation axis (R) can be dislocated relative to the rotation axis (R) by means of the adjustment device (30). The invention further relates to a rotating body (10; 22), in particular a fan (10) of a cooler blower for a combustion engine, or a shaft (21) or a rotor (22) of an electric motor (20), comprising an adjustment device (30) according to the invention.

23 Claims, 9 Drawing Sheets

(56) References Cited

FOREIGN PATENT DOCUMENTS

| | | |
|---|---|---|
| JP | 2000352397 | 12/2000 |
| JP | 2005509109 | 4/2005 |
| JP | 2006316661 | 11/2006 |
| JP | 2006322325 | 11/2006 |
| JP | 2008223645 | 9/2008 |
| WO | 0220995 | 3/2002 |
| WO | 02097279 | 12/2002 |

* cited by examiner

Fig. 27

ADJUSTMENT DEVICE FOR A ROTATING BODY AND ROTATING BODY

BACKGROUND OF THE INVENTION

The invention relates to an adjusting device for a rotary body, in particular for a fan of a cooling blower of an internal combustion engine, or a shaft or a rotor of an electric motor. The invention also relates to a rotary body, in particular a fan, a shaft or a rotor.

Dynamic imbalances arise when an axis of rotation of a component or rotary body no longer coincides with one of the stable main axes of inertia of the component. It is prior art for fans for cooling an internal combustion engine and other rotating components, such as for example motor armatures, drivers and rotors, to be geometrically designed so as to generate the least possible dynamic imbalance while adhering to specified dimensions. Real component geometries however exhibit dimensional and position errors with respect to an ideal, tolerance-free model, with the result that there is always a dynamic imbalance. To limit the maximum dynamic imbalance, components of cooling blowers must be produced with low dimensional and position tolerances. Furthermore, effects of the dynamic imbalance are often limited by means of cumbersome damping and/or decoupling measures.

A present complaint is high dynamic imbalances of cooling fans in motor vehicles, because these incite mechanical vibrations and can thereby cause noises, steering wheel vibration or possibly even rapid bearing wear in the blower motors. Said problem is intensified with increasing blower dimensions, in particular fan diameter, and noise sensitivity. Furthermore, there is an emerging trend in the automobile industry, motivated by the problem of minimizing $CO_2$, for the weight reduction of vehicles to be expedited and for increasing use to be made of highly rigid, lightweight front ends and body fixtures without decoupling elements, damping elements or absorber masses. As a result, the transmission behavior of the mechanical vibrations (forces) caused by the dynamic imbalance into a passenger compartment is adversely affected; the described problem is intensified. Previous specifications provide dynamic imbalance limits which are still practicable, and which presently lie at a maximum of 25,000 $g \cdot mm^2$. Dynamic imbalance limits of a maximum of 1,500 to 2,000 $g \cdot mm^2$ will however be demanded in future. With the design concepts and production methods known today, such demands can no longer be expediently met in an economical manner, because either very high scrap rates are to be expected or the fans become too expensive.

SUMMARY OF THE INVENTION

It is an object of the invention to provide an improved rotary body, in particular an improved fan of a cooling blower or an improved rotor of an electric motor. Here, it should be possible to retroactively minimize a dynamic imbalance of the rotary body, wherein it should preferably be possible to retroactively correct an alignment of a main axis of inertia on the rotary body. Furthermore, the rotary body according to the invention should be of simple construction and cheap to produce.

The object of the invention is achieved by means of an adjusting device for a rotary body, in particular of a fan of a cooling blower of an internal combustion engine, or a shaft or a rotor of an electric motor, having an axis of rotation, and by means of a rotary body, in particular a fan, a shaft or a rotor, having an adjusting device according to the invention.

The adjusting device according to the invention for a rotary body, having an axis of rotation, is designed such that a mass which is rotatable about the axis of rotation can be displaced—that is to say moved, pivoted, positioned, etc.— relative to the axis of rotation. Here, the rotary body according to the invention has the adjusting device according to the invention, wherein said adjusting device is provided detachably on or fixedly in/on the rotary body or is integrated into the rotary body. For example, a distribution of a rotatable mass, an arrangement of the rotary body and/or an arrangement of a portion of the rotary body relative to the axis of rotation can be varied by means of the adjusting device, wherein preferably a main axis of inertia of the rotary body can be aligned with the axis of rotation. The main axes of inertia of a component or of a component assembly can thus be brought at least approximately into alignment with the axis of rotation.

A rotatable mass can be displaced along and/or at an angle relative to the axis of rotation by means of the adjusting device. Furthermore, the rotary body or a portion of the rotary body can be at least partially displaced relative to the axis of rotation by means of the adjusting device. Here, according to the invention, it is possible for the rotatable mass in question to be displaced, that is to say for the imbalance to be compensated, temporally subsequent to a normal mounting process of the rotary body.

In a variant of the invention, a displaceable rotatable mass is a balancing mass which can be moved in translation and/or rotation with respect to the axis of rotation by means of an adjusting mechanism of the adjusting device. In a second variant of the invention, a displaceable rotatable mass is the entire rotary body or a portion of the rotary body, which can be pivoted relative to the axis of rotation by means of a tilting mechanism. In a third variant of the invention, a displaceable rotatable mass is a portion of the rotary body which can be positioned relative to another portion of the rotary body by means of a displacement mechanism.

In the first variant of the invention, the adjusting mechanism may have a threaded element and/or a guide by means of which or in which the balancing mass can move relative to the axis of rotation. Here, the adjusting mechanism may be provided on a bracket, for example a clip, which may furthermore be detachably connected to the rotary body. Furthermore, in the first variant of the invention, the adjusting mechanism may have a support which can be mounted on the rotary body and which has a balancing mass which is if appropriate displaceable relative to the support, wherein the support can be rigidly connected to the rotary body or can be provided so as to be movable in translation and/or rotation relative to the rotary body. In the second variant of the invention, the tilting mechanism may be a spring element or an if appropriate hardenable, elastically and/or plastically deformable element, in particular a rubber or elastomer element, by means of which the rotary body can be pivoted or displaced relative to the axis of rotation. In the third variant, the displacement mechanism may have a threaded element or a wedge by means of which one portion of the rotary body can be positioned or adjusted or clamped relative to another portion of the rotary body.

According to the invention, the dynamic imbalance of a rotary body, for example of a blower, can be significantly reduced and adjusted, resulting in a technical competitive advantage. Furthermore, the invention is of simple construction, is therefore robust and can therefore be realized cost-effectively. Furthermore, it is possible for the invention to be provided retroactively, as a result of which already existing rotary bodies need not be exchanged, and existing production lines need not be converted.

BRIEF DESCRIPTION OF THE DRAWINGS

The invention will be explained in more detail below on the basis of exemplary embodiments and with reference to the appended drawing. In the drawing.

DETAILED DESCRIPTION

The invention described below on the basis of a fan 10, a motor shaft 21 and a motor rotor 22 is not intended to be restricted to such rotary bodies 10, 21, 22 but rather is intended to be applicable to all rotary bodies, preferably to rotary bodies of flat, disk-shaped design. This applies for example to axial fans in computers, radial blowers for heaters, household ventilators, crankshaft disks, gearwheels etc. Furthermore, below, a body should be understood not only to mean a materially integral body but rather also something which may have a plurality of constituent parts, that is to say should be understood in the sense of a component or device; it is also the case here that the rotary body 10, 21, 22 should be understood to mean a body in the above sense, which is designed and suitable for rotating at least theoretically stably about an axis of rotation R. Arrows in the drawing in each case indicate possible movements of a respective part or portion.

The invention relates for example to a part or component assembly which rotates with a blower and which makes it possible at least once to retroactively permanently set in a targeted manner the alignment of an axis of inertia of an axial blower or of blower components. In this way, the dynamic imbalance of individual blower components, in particular of the fan 10, or of the blower as a whole, can be optimized. Embodiments and features of the three variants of the invention described below may be combined with one another.

The first variant of the invention is characterized in that the fan 10 (rotary body 10) or the motor rotor 22 (rotary body 22) or the motor shaft 21 (rotary body 21) has an adjusting device 30 designed as an adjusting mechanism 310, by means of which a balancing mass 311 can be moved relative to the fan 10 or the motor rotor 22 or the motor shaft 21. Here, the balancing mass 311 can be displaced or moved in translation and/or in rotation, and secured, relative to the axis of rotation R, that is to say relative to the fan 10 or the motor rotor 22 or the motor shaft 21. It is preferable for three adjusting mechanisms 310 according to the invention to be situated on a blower 10; any desired other number may of course also be used—this also applies to the other variants of the invention.

According to the invention, the adjusting mechanism 310 is integrated into a blower, wherein said adjusting mechanism causes a change in position of a mass distribution of the blower, which may be achieved for example by means of an additional mass (balancing mass 311) on an adjusting screw/spindle; a weight (balancing mass 311) which is clamped and displaceable in an external thread, or some other means which retroactively locally varies the preferred axial position of a mass, for example by means of an adjusting ring or a rotary weight.

Figure 1:
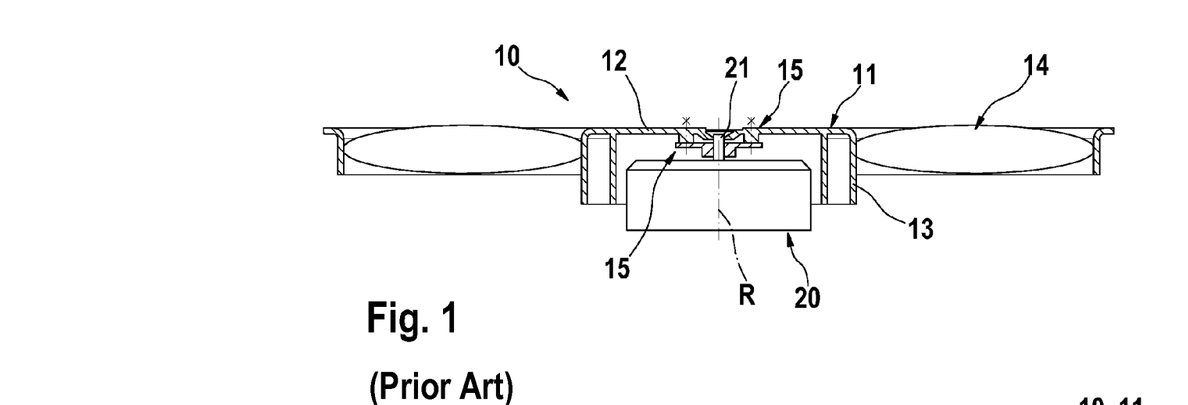
FIGS. 1, 3, 13, 17 and 22 show a fan, or a fan and the fastening thereof to a motor shaft or a motor rotor, as per the prior art, for a cooling blower of an internal combustion engine of a motor vehicle.
Figure 2:
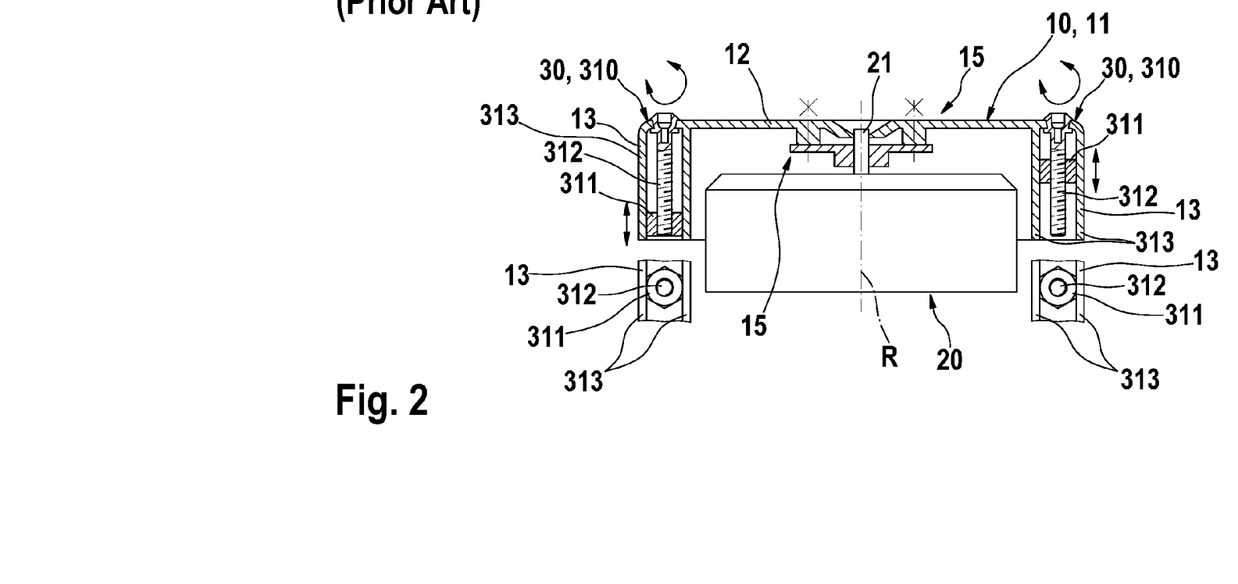
FIGS. 2, 4 to 11 and 14 to 16 show a multiplicity of embodiments of a first variant of the invention, wherein an adjusting device for the fan or the motor rotor is designed as an adjusting mechanism, by means of which a mass can be moved along an axis of rotation of the fan or of the motor rotor.
Figure 3:
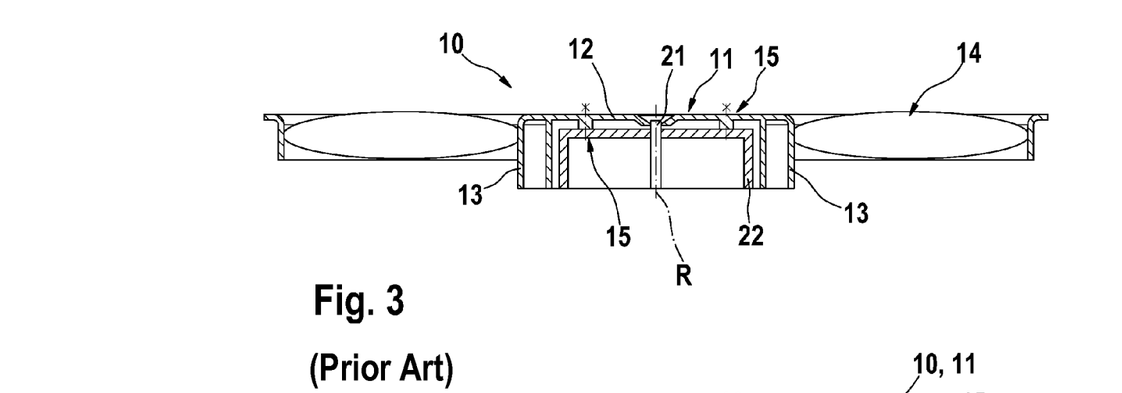
Figure 4:
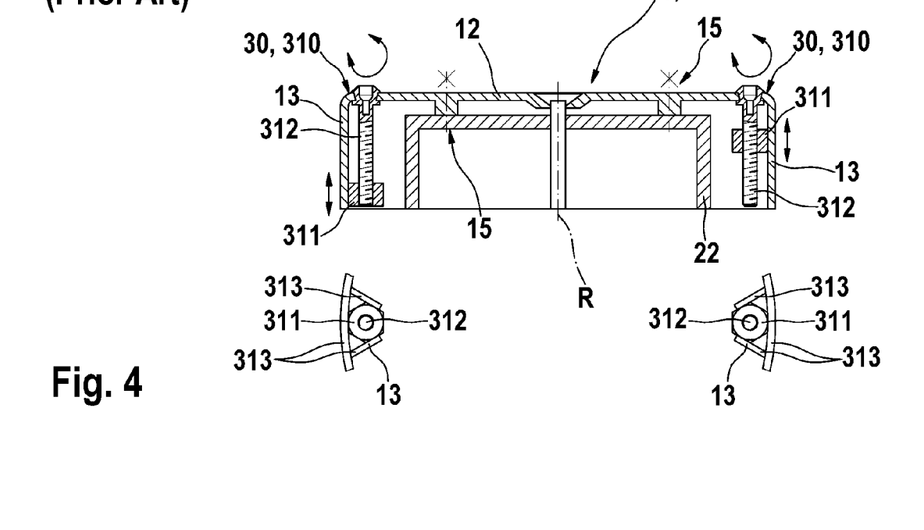
Figure 5:
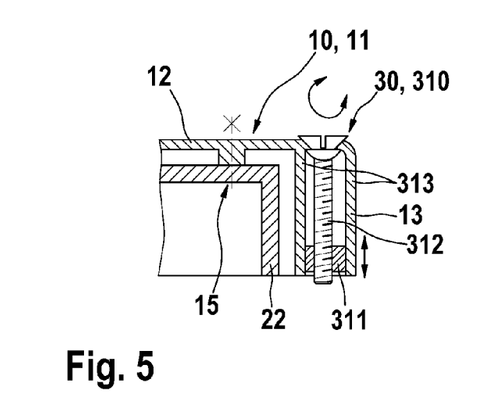

In one embodiment, the adjusting mechanism 310—illustrated on a fan 10 which is connected (fastening 15) to a motor shaft 21 of a conventional electric motor 20 for a blower (FIG. 2) or a motor rotor 22 (FIGS. 4 and 5)—has a threaded element 312 such as for example a threaded rod 312 (FIGS. 2 and 4) or a screw 312 (FIG. 5), with fastening and adjustment contour; the balancing mass 311 which can be moved by means of the threaded element 312 and which is designed for example as a nut 311; and a guide 313. Here, the balancing mass 311 is seated with its internal thread on an external thread of the threaded element 312 and is geometrically constrained so as to be prevented from co-rotating with the threaded element 312 by the guide 313. Here, the adjusting mechanism 310 extends along an axial portion 13 of a hub 11 of the fan 10 parallel to the axis of rotation R of the fan 10, as a result of which the balancing mass 311 can be moved substantially parallel to the axis of rotation R by means of the threaded element 312. Here, the threaded element 312 is preferably mounted with a head on preferably an outer radial portion 12 of the fan 10, which has a device for rotating the threaded element 312. Here, FIGS. 2 and 4 show alternative guides 313 for the balancing mass 311, which guides are formed in each case by a region of an axial portion 13 of the blower 10 and which form a type of shaft. Furthermore, FIG. 5 shows, as a threaded element 312, a screw 312 with speed nut.

Figure 6:
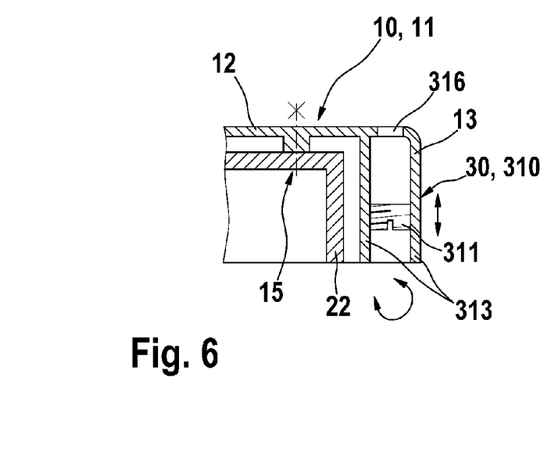
Figure 7:
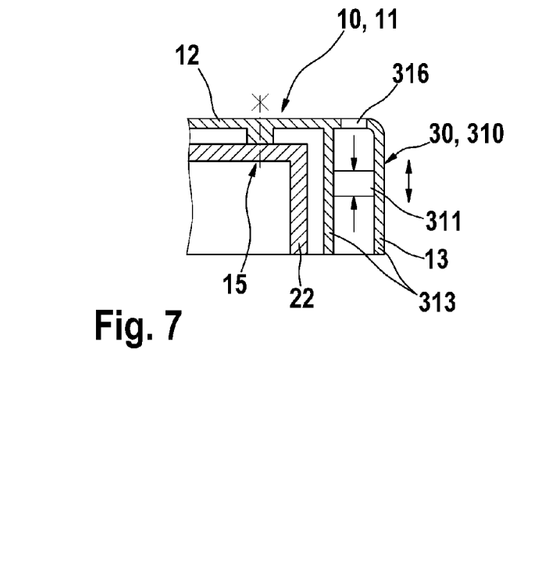
Figure 8:
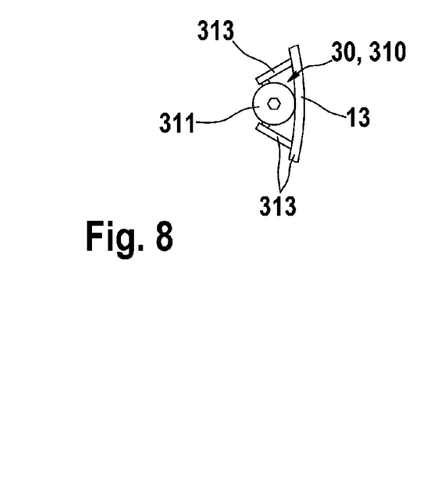

FIGS. 6 to 8 show possible alternatives to a threaded element 312, wherein the balancing mass 311 is no longer geometrically constrained in the guide 313 but is secured or clamped in the guide 313 over all or part of the circumference. Here, the balancing mass 311 may be accessible from one or both end sides of the fan 10. For this purpose, it is preferable for a passage recess 316 to be situated in an outer edge region of the radial portion 12 of the fan 10 centrally over the guide 313, through which passage recess the balancing mass 311 can be accessed, for example for a screwdriver or some other tool. In FIG. 6, the balancing mass 311 has an external thread which can be screwed into and out of an internal thread of the guide 313; here, the guide 313 is formed as a type of screw dome. FIG. 7 shows a balancing mass 311 which is clamped in the guide 313 but which is displaceable along the axis of rotation R, as indicated by two force arrows. FIG. 8 shows an only partially encompassed thread for the balancing mass 311.

Figure 9:
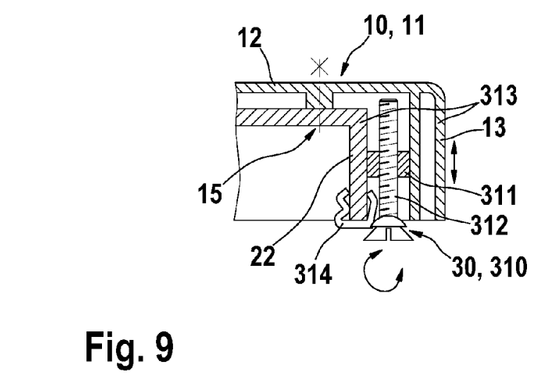
Figure 10:
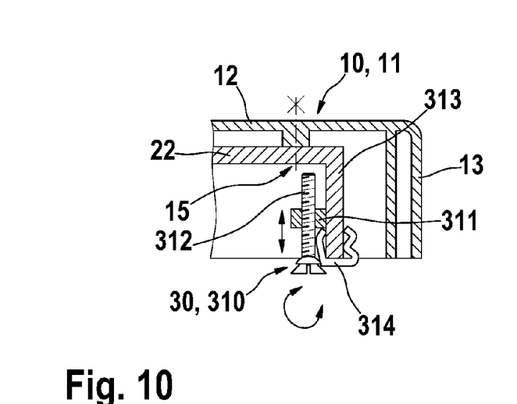
Figure 11:
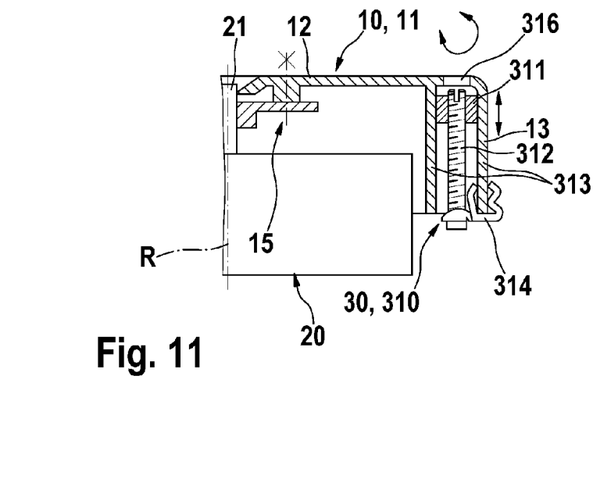
Figure 12:
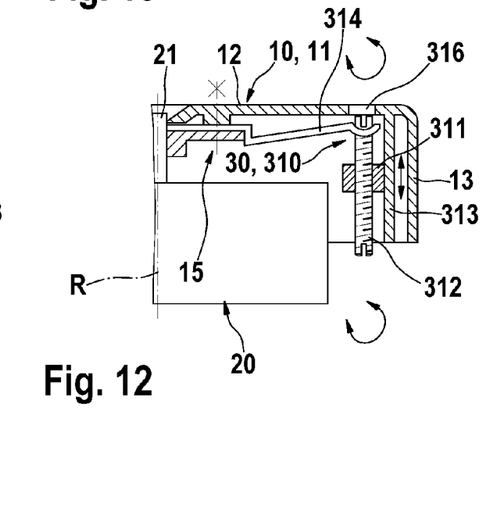
Figure 13:
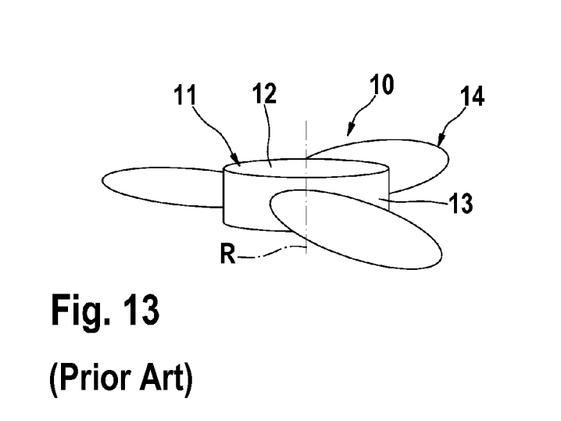

The embodiments according to FIGS. 9 to 12 show adjusting mechanisms 310 which can be retroactively provided on a rotary body 10, 21, 22 and which each have the threaded element 312, the balancing mass 311 which can be moved by means of the threaded element 312, and a bracket 314. Here, the bracket 314 may be designed for example as a retaining clip 314 (FIGS. 9 to 11) or a retaining arm 314 (FIG. 11). Here, FIGS. 9 and 10 show an adjusting mechanism 310 having a screw 312 as a threaded element 312, the head of which is fixed to a motor rotor 22 by means of the retaining clip 314. Here, the screw 312 extends in the axial direction on the motor rotor 22, wherein an outer side (FIG. 9) or an inner side (FIG. 10) of the motor rotor 22 serves as a guide 313 for the balancing mass 311 on the screw 312. Furthermore, an inner side of the fan 10 may additionally serve as a guide 313 (FIG. 9). FIG. 11 shows, as an adjusting mechanism 310, a threaded rod 312 which is fastened to the fan 10 by means of a retaining clip 314, wherein the threaded rod 312 is accessible for an adjusting tool through a passage recess 316 in the fan 10; the retaining clip 314 is provided and connected to the fan 10 opposite said passage recess. FIG. 12 shows an adjusting mechanism 310 which is coupled to the motor shaft 21, wherein a threaded rod 312 is provided spaced apart from the motor shaft 21 by means of a retaining arm 314. Here, the threaded rod 312 is provided adjacent to an inner side of the hub 11 and substantially parallel to the axial portion 13 thereof. Here, a guide 313 for the balancing mass 311 seated on the threaded rod 312 is realized by the adjacent inner side, that is to say a wall, of the hub 11.

Figure 14:
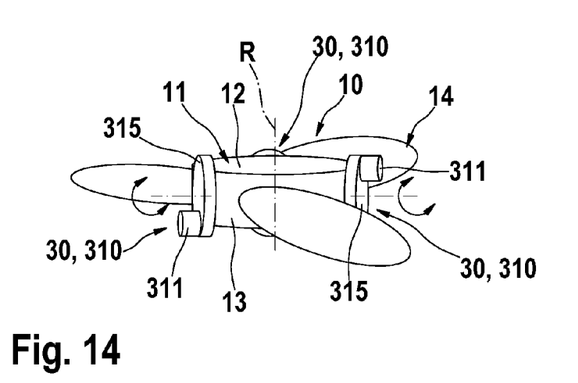
Figure 15:
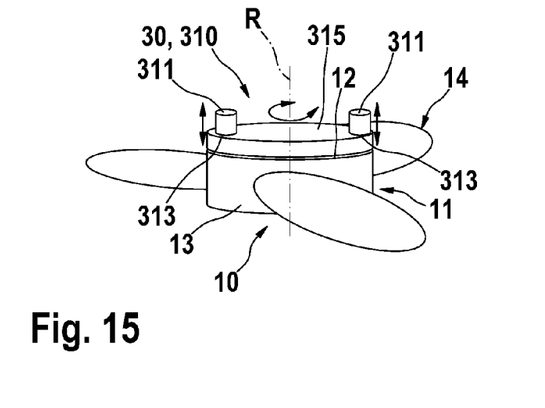
Figure 16:
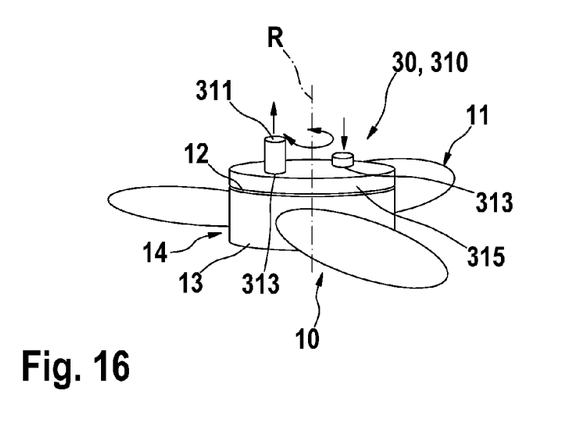

In the embodiment according to FIG. 14, the fan 10 has, on its axial portion 13, a disk-shaped support 315 which has an eccentrically arranged balancing mass 311. Here, the support 315 is provided with its large-area side substantially parallel to the axial portion 13 and is rotatably connected to the latter. The balancing mass 311 assumes a different position (height) on the fan 10 according to a rotational position, which can be fixed for example by means of a screw or a latching mechanism (neither of which is illustrated), of the support 15, whereby imbalance compensation is possible. FIGS. 15 and 16 show a support 315 which is arranged parallel to the radial portion 12 of the hub 11 of the fan 10 and which is connected thereto so as to be rotatable about the axis of rotation R. A rotational position can again be fixed for example by means of a screw or a latching mechanism (neither of which is illustrated). The support 315 has at least one eccentrically situated balancing mass 311 which is mounted in the support 315 (guide 313) and the height of which with respect to the support 315 can be varied. Here, a height position of the balancing mass 311 can again be fixed.

The second variant of the invention is characterized in that the fan 10 (rotary body 10) has an adjusting device 30 which is designed as a tilting mechanism 320 and by means of which the fan 10 can be pivoted or tilted relative to the axis of rotation R. Here, it is preferable for the entire filter 10, if appropriate with attachment parts (not illustrated in FIGS. 18 to 21), to be displaceable relative to the axis of rotation R; embodiments are however also possible in which only parts or portions of the fan 10 are pivotable or tiltable. In the second variant, a variation of an angle between a fan plane and the axis of rotation R takes place, wherein for example a fan fastening screw (15) is tightened and an elastic element such as for example an O-ring, a spring or a hardenable component etc. is deformed. It is preferable here for a fastening 15 of the fan 10 to function as a constituent part of the tilting mechanism 320; it is self-evidently also possible for an independent tilting mechanism to be provided (likewise not illustrated in FIGS. 18 to 21).

Figure 17:
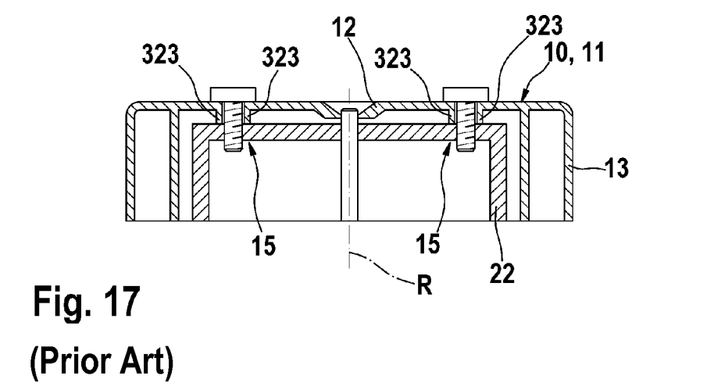
Figure 18:
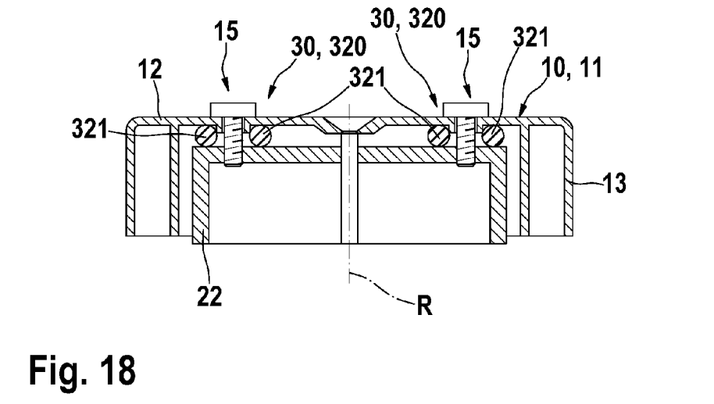
FIGS. 18 to 21 show a multiplicity of embodiments of a second variant of the invention, wherein an adjusting device for the fan is designed as a tilting mechanism by means of which the fan can be pivoted with respect to its axis of rotation.
Figure 19:
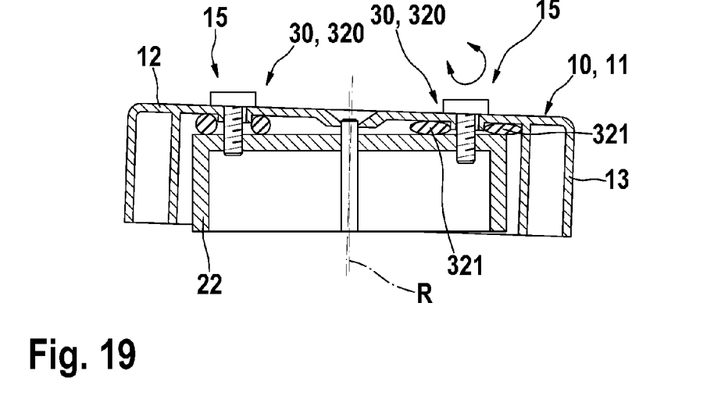

In one embodiment (FIGS. 18 and 19) of the invention, a fixed stop 323 (prior art, FIG. 17) of the fan 10 on the motor rotor 22 is replaced by a deformable element 321. That is to say, between the motor rotor 22 and the hub 11, in particular the radial portion 12, the deformable element 321 is provided as a type of spacer. It is preferable here for in each case one deformable element 321 to be provided around a fastening screw of the fastening 15. It is self-evidently also possible for a single deformable element 321 to be provided around all the fastenings 15. It is now possible according to the invention, according to how tightly a respective fastening screw is tightened, for an angular position of the entire fan 10 or of a part thereof relative to the axis of rotation R to be set within certain angle limits (FIG. 19), as a result of which a retroactive alignment of the axes of inertia is realized. The deformable element 321 is elastically and/or plastically deformable, if appropriate hardenable, and is in particular formed as a rubber element, an elastomer element, an O-ring or an X-ring etc. It is also possible for the fixed stop 323 to be designed such that it can be plastically or elastically deformed by the fastening 15 of the fan 10; the deformable elements 321 may then if appropriate be omitted.

Figure 20:
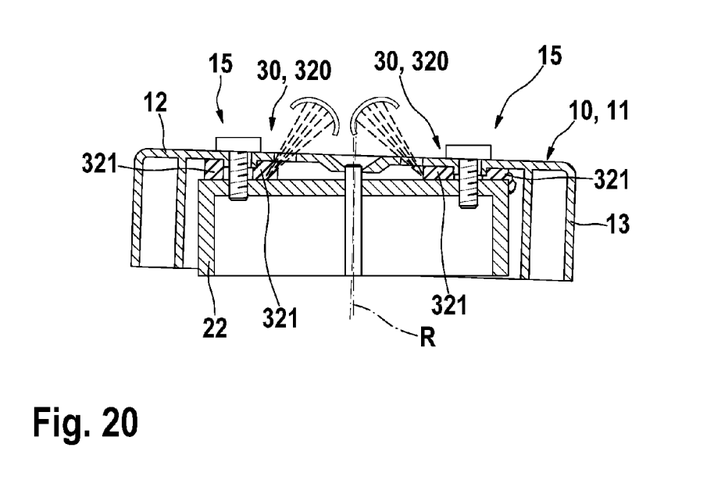
Figure 21:
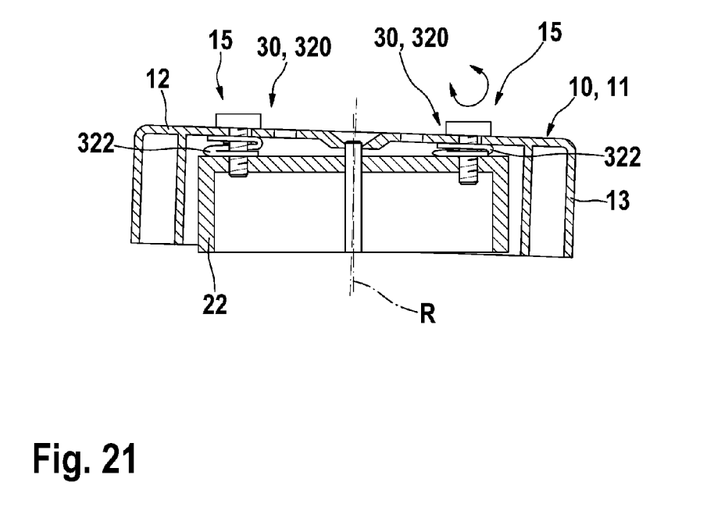
Figure 22:
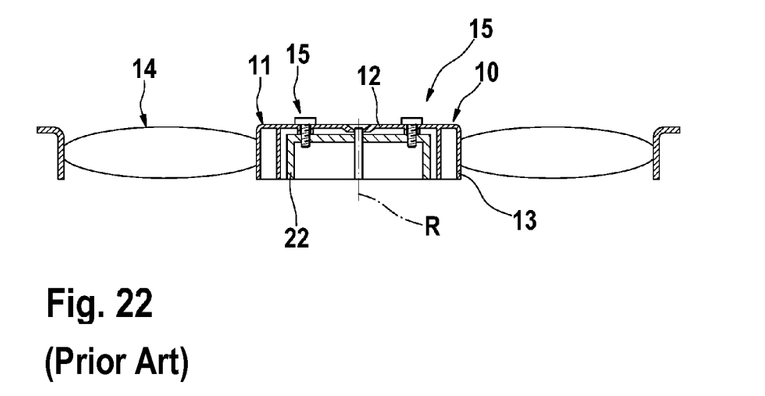

In the embodiment illustrated in FIG. 20, the deformable elements 321 are hardenable. Here, the fan 10 is mounted on the motor rotor 22 and the fastenings 15 are designed so as to generate as far as possible no imbalance, or only a small imbalance, of the fan 10 on the motor rotor 22. The deformable elements 321 are subsequently subjected to a hardening process. This may be realized for example by means of an activation (UV irradiation, heat etc.) of a for example highly viscous and if appropriate pre-shaped duroplastic mass. In the embodiment illustrated in FIG. 21, spring elements 322, such as for example a spiral spring, a plate spring etc., are used instead of the deformable elements 321.

The third variant of the invention is characterized in that the fan 10 (rotary body 10) has an adjusting device 30 which is designed as a displacement mechanism 330 and by means of which one portion of the fan 10 can be displaced, pivoted, tilted or positioned relative to another portion of the fan 10, as a result of which a rotational behavior of the fan 10 about the axis of rotation R can be adjusted. Here, the components are preferably mechanically clamped to one another, which leads for example to a single-sidedly adjustable change in shape or position which deforms or tilts partial regions of the fan 10. This is realized for example by means of an axial and/or lateral adjusting screw, an adjustable wedge, a spacer, a clamping spindle, a clamping strap and/or the like, which adjustably influences a mutual position or a mechanical clamping of the fan 10. Here, it is preferable for a vane 14 of the fan 10 to be positioned relative to the hub 11 of the fan 10. Instead of mechanical clamping, a joint (not illustrated in FIGS. 23 to 27) may also be provided by means of which the two portions can be pivoted relative to one another.

Figure 23:
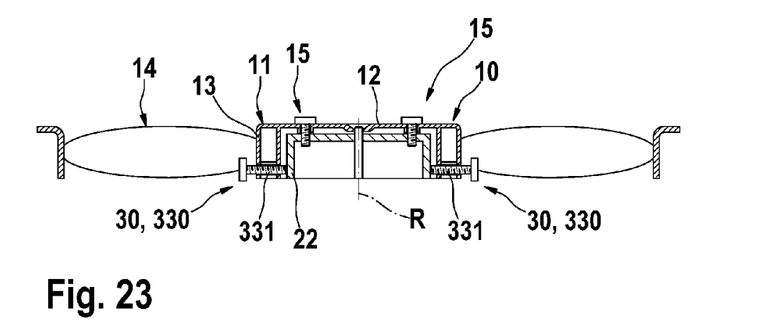
FIGS. 23 to 27 show a multiplicity of embodiments of a third variant of the invention, wherein an adjusting device of the fan is designed as a displacement mechanism by means of which one portion of the fan can be displaced relative to another portion of the fan.
Figure 24:
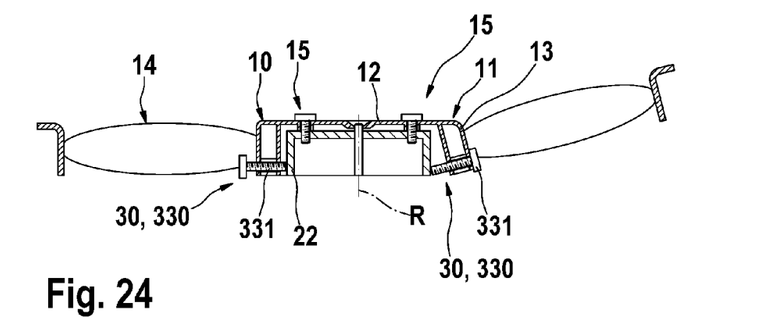
Figure 25:
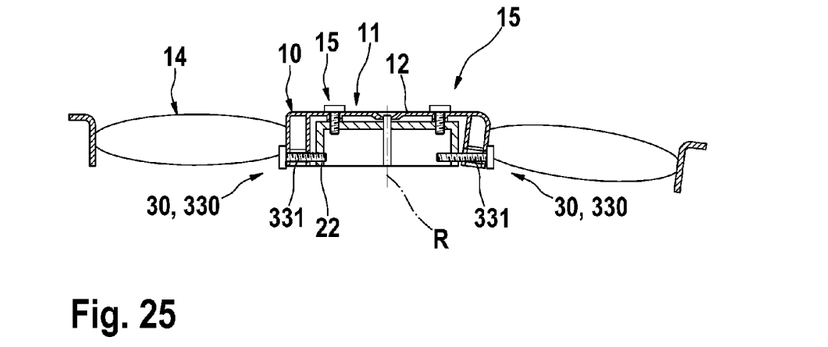

FIGS. 23 and 24 illustrate an embodiment of a displacement mechanism 330 of said type, wherein a lateral threaded element 331, in the present case in the form of an adjusting screw 331, can be screwed in a preferably lower axial portion 13 (with regard to FIGS. 23 and 24) of the hub 11 against an outer side of the motor rotor 22, wherein the adjusting screw 331 does not engage into the motor rotor 22. In this way, a respective portion of the fan 10 moves away from the motor rotor 22. In the present case, this is a portion of the hub 11 and an associated vane 14, wherein the respective portion of the hub 11 and the remaining part of the hub 11 are distorted relative to one another. Illustrated in FIG. 25 is an adjusting screw 331 (threaded element 331) which can be screwed into the motor rotor 22, as a result of which the respective portion of the fan 10 can be moved away in an opposite direction; that is to say the respective portion of the hub 11 moves toward the motor rotor 22.

Figure 26:
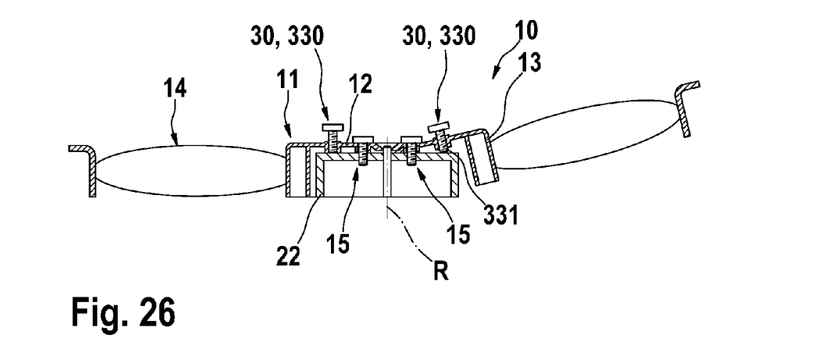

It is also possible for the threaded element 331 to be provided axially along the axis of rotation R, wherein, as illustrated in FIG. 26, said threaded element is provided preferably in the radial portion 12 of the hub 11, and there preferably in an outer edge region of the radial portion 12. Here, the threaded element 331, which is likewise designed as a screw 331, can be screwed against the motor rotor 22, wherein the respective portion of the hub 11, preferably including a vane 14, is moved away from the motor rotor 22. Here, the screw 331 does not engage into the motor rotor 22.

Figure 27:
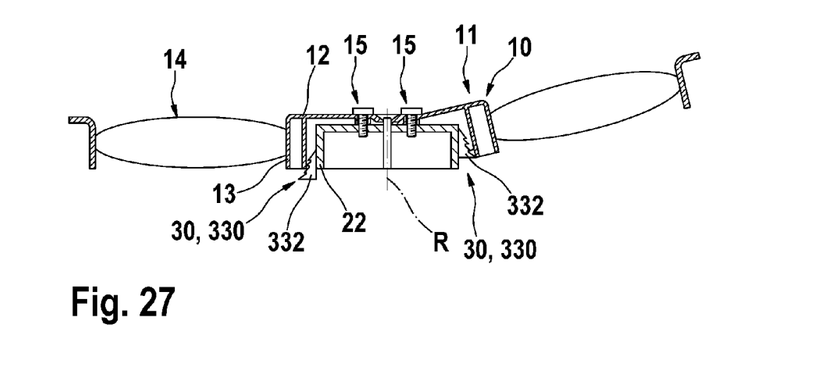

A kinematically inverted embodiment is self-evidently possible in which the screw 331 can then be screwed for example at the end side into the motor rotor 22 (not illustrated in FIGS. 23 to 27). FIG. 27 shows the use of a wedge 332. Here, a wedge 332 is pushed in between the hub 11, in particular the axial portion 13 thereof, and the motor rotor 22, as a result of which a respective portion of the hub can be moved away from the motor rotor 22. Here, it is preferable for mutually corresponding latching devices to be provided for locking the wedge 332 and the hub 11, alternatively the motor rotor 22, with respect to one another.

What is claimed is:

1. An apparatus comprising a rotary body (10; 21; 22) having an axis of rotation (R), a balancing mass (311) which is rotatable about the axis of rotation (R), and an adjusting device (30, 310) for displacing the balancing mass along a direction parallel to the axis of rotation (R), wherein the rotary body (10; 21; 22) includes a central hub (11) with an axial portion (13), wherein the adjusting device (30, 310) includes a guide (313) that forms part of the axial portion (13) and extends parallel to the axis of rotation, and wherein when the balancing mass (311) is in an installed state on the apparatus, the balancing mass (311) remains disposed at all times within the guide (313) so as to move only along the direction parallel to the axis of rotation within the guide (313).

2. An apparatus as claimed in claim 1, wherein a distribution of the balancing mass (311) can be varied by the adjusting device (30), wherein a main axis of inertia of the rotary body (10; 21; 22) can be aligned with the axis of rotation (R).

3. An apparatus as claimed in claim 1, wherein the balancing mass (311) can be displaced by the adjusting device temporally subsequent to a mounting process of the rotary body (10; 21; 22).

4. An apparatus as claimed in claim 1, wherein the adjusting device (310) has a threaded element (312) by means of which or in which the balancing mass (311) can move.

5. An apparatus as claimed in claim 1, wherein the adjusting device (310) is provided on a bracket (314) detachably mounted on the rotary body (10).

6. An apparatus as claimed in claim 1, wherein the adjusting device (310) has a support (315) which can be mounted on the rotary body (10) and which includes the balancing mass (311) which is displaceable relative to the support (315), wherein the support (315) can be rigidly connected to the rotary body (10).

7. An apparatus as claimed in claim 1, wherein upon movement of at least a portion of the adjusting device, the adjusting device moves the balancing mass (311) linearly along the direction parallel to the axis of rotation (R).

8. An apparatus as claimed in claim 1, wherein the adjusting device includes a threaded screw having external threads, and the balancing mass includes internal threads that are received over and engage the external threads.

9. An apparatus as claimed in claim 1, wherein the balancing mass is a first balancing mass disposed on a first side of the axis of rotation, and further comprising a second balancing mass disposed on a second side of the axis of rotation.

10. An apparatus as claimed in claim 1, wherein the apparatus is a fan having a rotor (10), the hub (11), and a plurality of blades (14), and wherein the balancing mass (311) is disposed at least partially within the hub (11).

11. The apparatus of claim 1, wherein the balancing mass (311) is configured to slide along and contact the guide (311) as the balancing mass (311) moved parallel to the axis of rotation.

12. An apparatus comprising a rotary body (10; 21; 22) having an axis of rotation (R), a mass (311; 10; 11, 14) which is rotatable about the axis of rotation (R), and an adjusting device (30) coupled to the rotary body for displacing the mass relative to the axis of rotation (R), wherein the adjusting device (30) is at least one of a tilting or displacement mechanism (320, 330) that includes at least two separate movable elements on opposing sides of the axis of rotation (R) that tilt at least one component of the apparatus.

13. The apparatus of claim 12, wherein the mass includes at least one of a group consisting of a rotor (22), a hub (11), and a fan blade (14), and wherein the adjusting device (30) includes at least two separate fastening screws (15).

14. The apparatus of claim 13, wherein the adjusting device (30) includes four separate fastening screws (15).

15. The apparatus of claim 14, wherein two of the fastening screws (15) extend parallel to the axis of rotation (R), and the other two fastening screws (15) extend perpendicular to the axis of rotation (R).

16. The apparatus of claim 12, wherein a portion of the rotary body (10; 21; 22) can be pivoted relative to the axis of rotation (R) by the tilting or displacement mechanism (320, 330).

17. The apparatus of claim 16, wherein the portion of the rotary body is a rotor (22).

18. The apparatus of claim 12, wherein the adjusting device (30) is a displacement mechanism (330), wherein a portion of the rotary body (10; 21; 22) can be displaced relative to the axis of rotation (R) by the displacement mechanism (320).

19. The apparatus of claim 18, wherein the portion of the rotary body is a fan vane (14).

20. The apparatus of claim 12, wherein the adjusting mechanism (30) includes a spring element (322) by means of which the rotary body (10) can be pivoted relative to the axis of rotation (R).

21. The apparatus of claim 20, wherein the adjusting mechanism (30) includes a hardenable, deformable rubber or elastomer element (321), by means of which the rotary body (10) can be pivoted relative to the axis of rotation (R).

22. The apparatus of claim 12, wherein the adjustment mechanism (30) includes a wedge (332) by means of which one portion (11, 14) of the rotary body (10) can be positioned relative to another portion (14, 11) of the rotary body (10).

23. The apparatus of claim 12, wherein a distribution of the rotatable mass (311; 10, 11, 14), an arrangement of the rotary body (10; 21; 22) and an arrangement of a portion of the rotary body relative to the axis of rotation (R) can be varied by the adjusting device (30), wherein a main axis of inertia of the rotary body (10; 21; 22) can be aligned with the axis of rotation (R).

* * * * *